(12) United States Patent
Takasu

(10) Patent No.: US 10,724,936 B2
(45) Date of Patent: Jul. 28, 2020

(54) MEASUREMENT APPARATUS, ENVIRONMENT MEASUREMENT APPARATUS AND MEASUREMENT METHOD

(71) Applicant: FUJITSU LIMITED, Kawasaki-shi, Kanagawa (JP)

(72) Inventor: Ryozo Takasu, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 69 days.

(21) Appl. No.: 16/244,153

(22) Filed: Jan. 10, 2019

(65) Prior Publication Data

US 2019/0234855 A1 Aug. 1, 2019

(30) Foreign Application Priority Data

Jan. 30, 2018 (JP) .................................. 2018-013194

(51) Int. Cl.
*G01N 15/06* (2006.01)
*G01N 15/14* (2006.01)
*G01N 15/00* (2006.01)

(52) U.S. Cl.
CPC ......... *G01N 15/06* (2013.01); *G01N 15/1459* (2013.01); *G01N 2015/0046* (2013.01); *G01N 2015/0693* (2013.01)

(58) Field of Classification Search
CPC .... G01N 15/06; G01N 15/02; G01N 15/0205; G01N 15/1456; G01N 15/1429; G01N 15/1425; G01N 15/14; G01N 2015/0046; G01N 2015/0042; G01N 2015/0693
See application file for complete search history.

(56) References Cited

U.S. PATENT DOCUMENTS

| 4,934,183 | A  | * | 6/1990 | Sommer | ................ | B60H 1/008 |
| | | | | | | 356/438 |
| 9,395,334 | B2 | * | 7/2016 | Takasu | ..................... | G01N 5/02 |
| 10,564,086 | B2 | * | 2/2020 | Takasu | ................... | G01N 15/06 |
| 2007/0048186 | A1 | * | 3/2007 | Call | ......................... | B07B 7/00 |
| | | | | | | 422/68.1 |
| 2008/0148869 | A1 | * | 6/2008 | Otani | ................. | G01N 15/1459 |
| | | | | | | 73/863.21 |

(Continued)

FOREIGN PATENT DOCUMENTS

| JP | 2006-010353 | 1/2006 |
| JP | 2009-030988 | 2/2009 |

*Primary Examiner* — John R Lee
(74) *Attorney, Agent, or Firm* — Fujitsu Patent Center

(57) ABSTRACT

A measurement apparatus includes: a measurement tank including an air inlet and an air outlet; a fan; a light source configured to irradiate micro-particulate matter with light; a photodetector configured to detect scattered light from the micro-particulate matter; a first circuit configured to detect individual particles of the micro-particulate matter based on an output of the photodetector; a second circuit configured to detect a micro-particle group of the micro-particulate matter based on the output of the photodetector; a switch configured to switch into one of a first state in which the output of the photodetector is input to the first circuit and a second state in which the output of the photodetector is input to the second circuit; and a controller configured to control a drive and stop of the fan, a turn-on and a turn-off of the light source, and a switching of a state of the switch.

17 Claims, 11 Drawing Sheets

(56) References Cited

U.S. PATENT DOCUMENTS

| | | | |
|---|---|---|---|
| 2009/0128810 A1* | 5/2009 | Bates | G01N 15/1012 356/336 |
| 2011/0214489 A1* | 9/2011 | Grant | G01N 1/4077 73/61.72 |
| 2014/0226158 A1* | 8/2014 | Trainer | G01J 3/0218 356/336 |
| 2014/0354976 A1* | 12/2014 | Evenstad | G01N 1/2211 356/72 |
| 2015/0235833 A1* | 8/2015 | Bazargan | H01J 49/0036 702/189 |
| 2015/0316463 A1* | 11/2015 | Pariseau | G01N 15/1459 356/338 |
| 2016/0223437 A1* | 8/2016 | Ajay | G08B 17/113 |
| 2017/0016820 A1* | 1/2017 | Tabaru | G01N 15/1459 |
| 2019/0145873 A1* | 5/2019 | Woolsey | G01N 1/2247 73/863.12 |
| 2019/0154550 A1* | 5/2019 | Wu | G01N 33/54366 |
| 2019/0234855 A1* | 8/2019 | Takasu | G01N 15/06 |

\* cited by examiner

MEASUREMENT APPARATUS, ENVIRONMENT MEASUREMENT APPARATUS AND MEASUREMENT METHOD

CROSS-REFERENCE TO RELATED APPLICATION

This application is based upon and claims the benefit of priority of the prior Japanese Patent Application No. 2018-013194, filed on Jan. 30, 2018, the entire contents of which are incorporated herein by reference.

FIELD

The embodiments discussed herein are related to a measurement apparatus, an environment measurement apparatus and a measurement method for measuring the concentration of micro-particulate matter.

BACKGROUND

The concentration of micro-particulate matter contained in the atmosphere is used as one of indicators of air pollution. In recent years, for example, many atmospheric measurement stations have been installed to measure the concentration of the micro-particulate matter such as PM2.5 from the relation with the effects on health. The atmospheric measurement stations use, for example, a beta (β) ray attenuation type measurement apparatus or a Tapered Element Oscillating Microbalance (TEOM) type measurement apparatus to measure the concentration of the micro-particulate matter. However, since these measurement apparatuses are expensive and large in size, they are not suitable for use by, for example, individuals.

Meanwhile, there has been proposed a simple measurement apparatus using a light scattering method. Such a measurement apparatus measures the concentration of the micro-particulate matter by measuring scattered light obtained by irradiating particles with light. Since the measurement apparatus using the light scattering method is less expensive, compacter, and easier to use than the measurement apparatuses used in the atmospheric measuring stations, it is suitable for use by, for example, individuals. For this reason, the measurement apparatus using the light scattering method is frequently used to measure the environments around users, such as the working environments.

When a measurement apparatus using the light scattering method is used for a long period of time, since the surface of an optical system such as a light source or a photodetector is contaminated, the measured values becomes inaccurate. The cause of contamination is the micro-particulate matter which is a main measurement target and adheres to the surface of the optical system such as a light source or a photodetector. However, when a filter is installed in the measurement apparatus for the purpose of preventing contamination caused by the micro-particulate matter, the measurement values of the micro-particulate matter serving as the measurement target will be affected. Therefore, it is not preferable to install a filter in the measurement apparatus. Meanwhile, when the optical system is cleaned, the measurement accuracy of the measurement apparatus is recovered, but the number of processes associated with the cleaning is increased. For example, in a case of a measurement apparatus which continuously operates in an unmanned state for a long period of time, it is not preferable to increase the number of processes associated with the cleaning. However, it is difficult to measure the concentration of the micro-particulate matter with high accuracy by suppressing the influence of contamination of the optical system without increasing the number of processes associated with the cleaning.

In addition, as methods of measuring scattered light by the light scattering method, there have been proposed various methods such as a counting detection method and an analog detection method which will be described below.

The counting detection method counts individual micro-particles by detecting light pulses generated when the micro-particulate matter passes through the field of view of a photodetector. Thus, the counting detection method has higher measurement accuracy for low concentration micro-particulate matter, but has lower measurement accuracy for high concentration micro-particulate matter as compared to the low concentration micro-particulate matter. This is because, when the number of micro-particles is large, a saturation occurs due to the counting loss of micro-particles when the high concentration micro-particulate matter is measured by the counting detection method.

Meanwhile, the analog detection method measures the light intensity of reflected light obtained by irradiating a particle group with light. For this reason, the analog detection method has higher measurement accuracy for high concentration micro-particulate matter, but has lower measurement accuracy for low concentration micro-particulate matter as compared to the high concentration micro-particulate matter. In a case of measuring the low concentration micro-particulate matter by the analog detection method, due to, for example, unsteadiness of the light intensity of light emitted from a light source, the measurement accuracy of the low concentration micro-particulate matter is relatively lower than the measurement accuracy of the high concentration micro-particulate matter.

Therefore, with a simple measurement apparatus using the light scattering method, it is difficult to continuously measure the concentration of the micro-particulate matter in a range from low concentration micro-particulate matter to high concentration micro-particulate matter with high accuracy.

Related techniques are disclosed in, for example, Japanese Laid-open Patent Publication Nos. 2009-030988 and 2006-010353.

SUMMARY

According to one aspect of the embodiments, a measurement apparatus includes: a measurement tank including an air inlet and an air outlet; a fan installed at the air outlet; a light source configured to irradiate micro-particulate matter disposed in the measurement tank with light; a photodetector configured to detect scattered light from the micro-particulate matter in the measurement tank; a first circuit configured to detect individual particles of the micro-particulate matter which flows from the air inlet to the air outlet in the measurement tank based on an output of the photodetector; a second circuit configured to detect a micro-particle group of the micro-particulate matter which flows from the air inlet to the air outlet in the measurement tank based on the output of the photodetector; a switch configured to switch into one of a first state in which the output of the photodetector is input to the first circuit and a second state in which the output of the photodetector is input to the second circuit; and a controller configured to control a drive and stop of the fan, a turn-on and a turn-off of the light source, and a switching of a state of the switch, wherein the controller turns on the light source while the fan is being driven, controls the switch in such a manner that the state is switched to the second state when a concentration of the micro-particulate matter which is calculated from the output of the first circuit is equal to or greater than a threshold value, and switches the switch to enter the first state when the concentration of the micro-particulate matter which is calculated from the output of the second circuit is less than the threshold value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

With a simple measurement apparatus using a light scattering method, it is difficult to measure the micro-particulate matter with high accuracy over a wide concentration range from a low concentration to a high concentration.

According to one aspect, the present disclosure provides a measurement apparatus and a measurement method capable of measuring the micro-particulate matter with high accuracy in a wide concentration range from a low concentration to a high concentration.

In the disclosed measurement apparatus and measurement method, the method of detecting the scattered light obtained from the micro-particulate matter irradiated with light in a measurement tank is switched according to the concentration of the micro-particulate matter such that the method of detecting individual micro-particles of the micro-particulate matter is adopted for a low concentration micro-particulate matter, and a method of detecting a particle group of the micro-particulate matter is adopted for a high concentration micro-particulate matter. Therefore, it is possible to measure the micro-particulate matter over a wide concentration range from a low concentration to a high concentration.

Hereinafter, embodiments of a measurement apparatus and a measurement method according to the present disclosure will be described with reference to the accompanying drawings.

Embodiments

Figure 1:
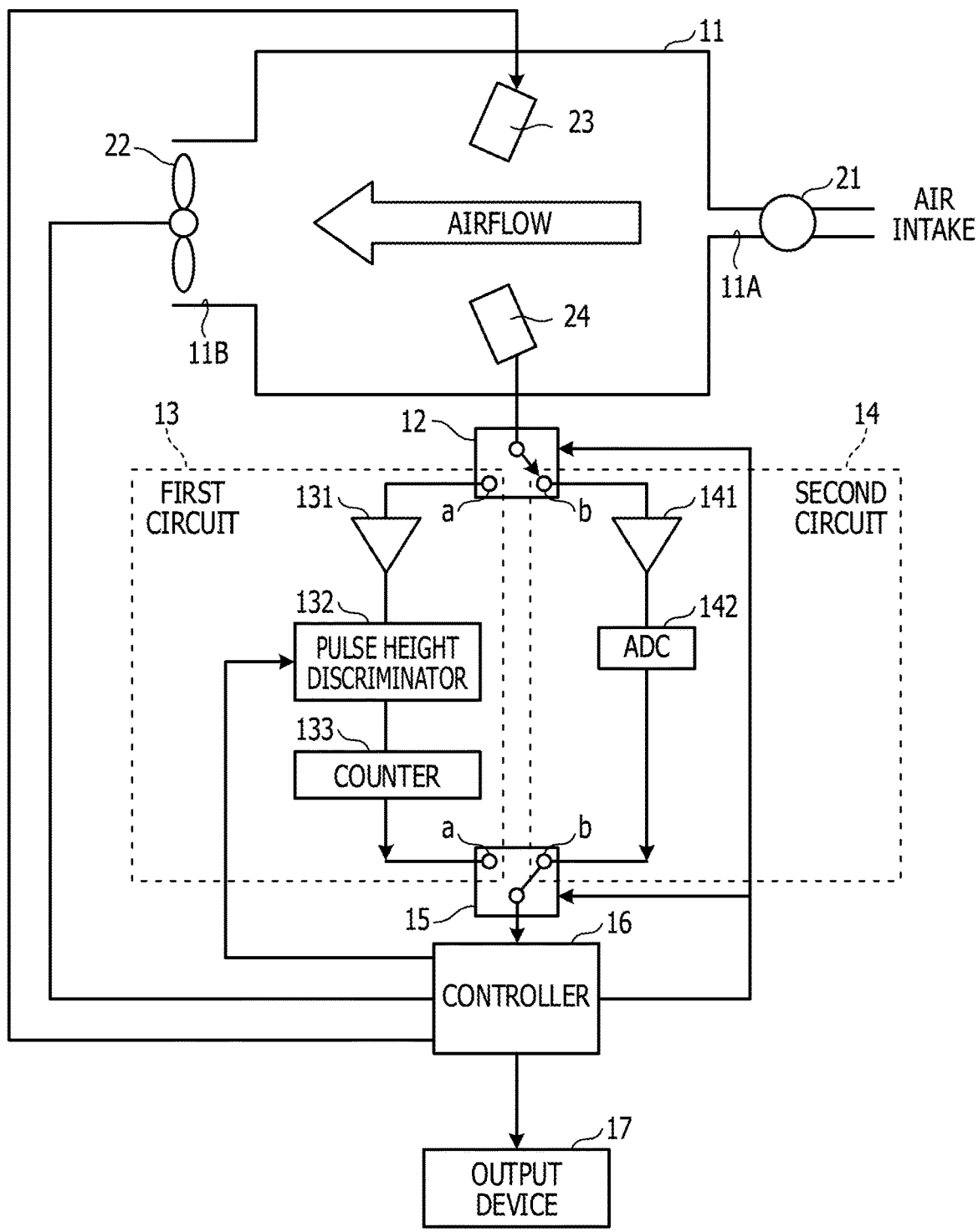
FIG. 1 is a view illustrating a measurement apparatus according to an embodiment.

FIG. 1 is a view illustrating a measurement apparatus according to an embodiment. A measurement apparatus 1 illustrated in FIG. 1 includes a measurement tank 11, a switch 12, a first circuit 13, a second circuit 14, a switch 15, a controller 16, and an output device 17.

A virtual impactor 21 is installed at an air inlet 11A of the measurement tank 11. The virtual impactor 21 allows the micro-particulate matter having a diameter smaller than a measurement target particle diameter to pass therethrough. A fan 22 is installed at an air outlet 11B of the measurement tank 11. In this example, a light source 23 and a photodetector 24 are installed in the measurement tank 11. When the fan 22 is driven to be rotated, the micro-particulate matter is introduced into the measurement tank 11 from the air inlet 11A through the virtual impactor 21, light from the light source 23 is irradiated to the micro-particulate matter, and the photodetector 24 receives light scattered from the micro-particulate matter. The photodetector 24 converts the received scattered light into an electric signal having signal intensity corresponding to the light intensity of the received scattered light.

The shape of the measurement tank 11 is not particularly limited, but may preferably be such that the airflow of, for example, the atmosphere from the air inlet 11A to the air outlet 11B illustrated in FIG. 1 is smoothly maintained. In addition, the shape of the measurement tank 11 may preferably be such that the light irradiation to the micro-particulate matter by the light source 23 and the detection of the scattered light from the micro-particulate matter by the photodetector 24 are facilitated in the measurement tank 11.

The position of the light source 23 is not particularly limited as long as the light source 23 is able to irradiate light to the micro-particulate matter in the measurement tank 11. For example, when light is irradiated through a window provided in the measurement tank 11, the light source 23 may be disposed outside the measurement tank 11. Further, the position of the photodetector 24 is also not particularly limited as long as the photodetector 24 is able to detect the scattered light from the micro-particulate matter in the measurement tank 11. For example, when the scattered light is received through a window provided in the measurement tank 11, the photodetector 24 may be disposed outside the measurement tank 11.

The first circuit 13 is an example of a circuit for measuring the scattered light from the micro-particulate matter by a counting detection method. Based on an electric signal output from the photodetector 24, the first circuit 13 counts individual particles of the micro-particulate matter flowing from the air inlet 11A to the air outlet 11B in the measurement tank 11. The first circuit 13 includes an amplifier 131 having a time constant $\tau 1$, a pulse height discriminator 132, and a counter 133. The pulse height discriminator 132 discriminates a pulse waveform (hereinafter, also simply referred to as a "pulse") having a height (or amplitude) equal to or greater than a pulse height threshold value from the electric signal output of the photodetector 24 amplified by the amplifier 131. For example, the pulse height discriminator 132 outputs a signal when the height of the signal pulse of the electric signal output of the photodetector 24 amplified by the amplifier 131 is equal to or greater than the pulse height threshold value. The counter 133 outputs a count value obtained by counting the number of pulses having a height equal to or greater than the pulse height threshold value discriminated by the pulse height discriminator 132.

Meanwhile, the second circuit 14 is an example of a circuit for measuring the scattered light from the micro-particulate matter by an analog detection method. Based on an electric signal output from the photodetector 24, the second circuit 14 detects a micro-particulate group of the micro-particulate matter flowing from the air inlet 11A to the air outlet 11B in the measurement tank 11. The second circuit 14 includes an amplifier 141 having a time constant τ2 and an analog-to-digital converter (ADC) 142. In this example, the time constant τ1 of the amplifier 131 of the first circuit 13 is smaller than the time constant τ2 of the amplifier 141 of the second circuit 14. The ADC 142 converts the electric signal output of the photodetector 24 amplified by the amplifier 141 into a digital value. The ADC 142 converts the electric signal output of the photodetector 24 amplified by the amplifier 141, for example, into a digital output value such as a digital voltage value.

The switch 12 is coupled to the side of a terminal "a" in a first state so as to input the electric signal output of the photodetector 24 to the first circuit 13, and coupled to the side of a terminal "b" in a second state so as to input the electric signal output of the photodetector 24 to the second circuit 14. The switch 15 is coupled to the side of the terminal "a" in a first state so as to input the count value output by the first circuit to the controller 16, and coupled to the side of the terminal "b" in a second state so as to input the digital output value output by the second circuit to the controller 16.

The controller 16 controls the drive (i.e., rotation) and stop of the fan 22, turn-on/off of the light source 23, and switching of the states of the switches 12 and 15. The controller 16 controls the state of the switch 15 to the first state or the second state in synchronization with the state of the switch 12. Further, when the digital output value is input from the second circuit 14, the controller 16 calculates the concentration of the micro-particulate matter based on the digital output value. When the count value is input from the first circuit 13, the controller 16 calculates the concentration of the micro-particulate matter based on the count value.

The controller 16 turns on the light source 23 while the fan 22 is being driven (rotated), and switches the switches 12 and 15 to the second state when the concentration calculated based on the count value input from the first circuit 13 is equal to or greater than a threshold value. When the concentration calculated based on the digital output value input from the second circuit 14 is less than the threshold value, the controller 16 switches the switches 12 and 15 to the first state. The controller 16 sets a pulse height threshold value for the pulse height discriminator 132 of the first circuit 13 to remove noises from the electric signal output of the photodetector 24 amplified by the amplifier 131. As described later, for example, the controller 16 may be formed by a computer including a processor such as a CPU and a storage device such as a memory.

The output device 17 outputs, for example, the concentration of the micro-particulate matter calculated by the controller 16. The output device 17 may be formed by, for example, a display device for displaying, for example, the concentration of the micro-particulate matter or a speaker for outputting sound.

In this example, the first circuit 13 and the second circuit 14 are physically separate circuits, but the first circuit 13 and the second circuit 14 may be incorporated in a single circuit device (or module). The single circuit device (or module) may include the switches 12 and 15, the first circuit 13, the second circuit 14, and the controller 16. The pulse height discriminator 132 and the counter 133 of the first circuit 13 may be formed by, for example, a digital signal processor (DSP) or the like. A single DSP forming the pulse height discriminator 132 and the counter 133 may also form the controller 16.

Next, the operation of the measurement apparatus 1 in the second state will be described. In the second state, the switches 12 and 15 are coupled to the side of the terminal "b." In the second state, when the controller 16 drives and rotates the fan 22, the micro-particulate matter is introduced into the measurement tank 11 from the air inlet 11A via the virtual impactor 21. The light from the light source 23 is scattered by the micro-particulate matter and received by the photodetector 24. Since the concentration of the micro-particulate matter in the measurement tank 11 is proportional to the light intensity of the scattered light, the signal intensity of the electric signal output of the photodetector 24 reflects the concentration of the micro-particulate matter. Therefore, the concentration of the micro-particulate matter may be measured based on the output of the ADC 142.

Figure 2:
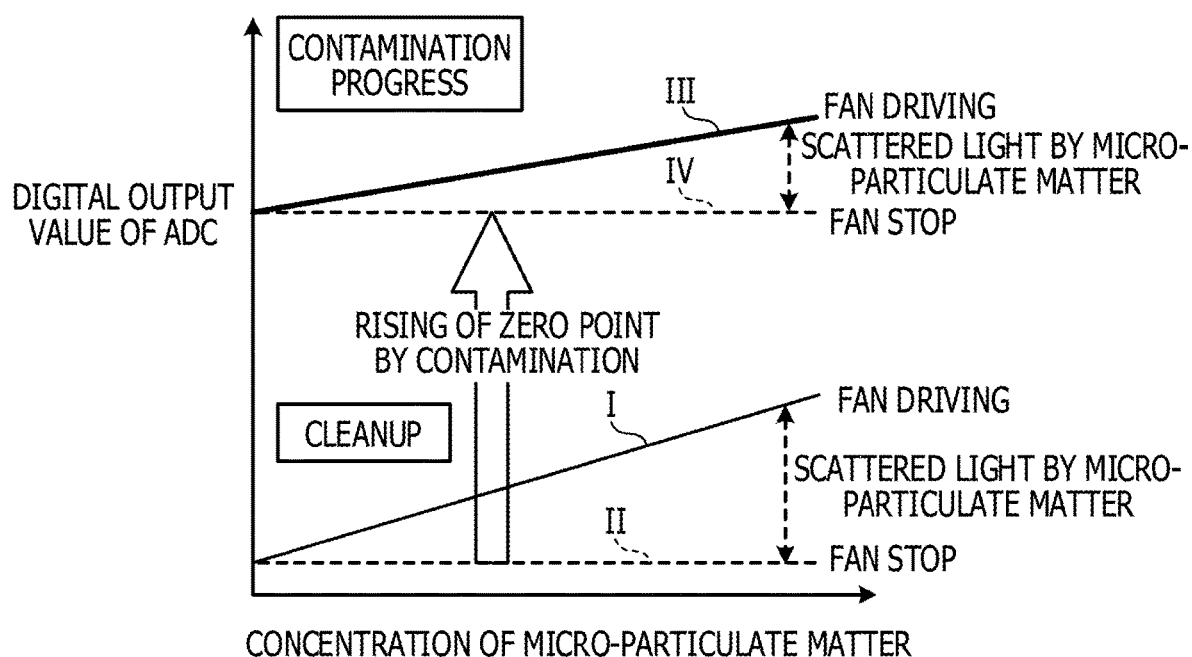
FIG. 2 is a view for explaining an example of a relationship between the concentration of micro-particulate matter and a digital output value of an ADC.

FIG. 2 is a view for explaining an example of the relationship between the concentration of the micro-particulate matter and the digital output value of the ADC 142. In FIG. 2, the vertical axis represents the digital output value of the ADC 142 in arbitrary units, and the horizontal axis represents the concentration of the micro-particulate matter in arbitrary units. The digital output value of the ADC 142 is proportional to the concentration of the micro-particulate matter, as indicated by a thin solid line I in FIG. 2, but due to stray light in the optical system such as the light source 23 and the photodetector 24, it contains an offset value, as indicated by a thin broken line II in FIG. 2. This offset value does not depend on the concentration of the micro-particulate matter. Therefore, the concentration of the micro-particulate matter may be calculated by the controller 16 executing the following steps ST1 to ST4 based on the digital output value of the ADC 142.

In step ST1, the controller 16 drives the fan 22 to introduce the micro-particulate matter into the measurement tank 11 from the air inlet 11A via the virtual impactor 21, and, in this state, reads the digital output value of the ADC 142. In this case, the light intensity corresponding to the sum of the scattered light and the stray light due to the micro-particulate matter is measured.

In step ST2, the controller 16 stops the fan 22 and reads the digital output value of the ADC 142 after a certain period of time until the micro-particulate matter in the measurement tank 11 sinks or adsorbs on the inner wall. Thereby, the light intensity of the stray light is measured. The certain period of time until the micro-particulate matter in the measurement tank 11 sinks or adsorbs on the inner wall may be set according to, for example, the size or shape of the measurement tank 11 and may be set with an experience value.

In step ST3, the controller 16 divides a difference obtained by subtracting the digital output value read in step ST2 from the digital output value read in step ST1 by the slope of the line I. Thereby, the concentration of the micro-particulate matter is calculated.

In step ST4, the controller 16 repeats the above-described steps ST1 to ST3 to make a continuous measurement possible. However, during the loop operation of steps ST1 to ST3, the controller 16 does not need to execute step ST2 every time, and may appropriately omit step ST2 until the time at which the contamination of the optical system such as the light source 23 and the photodetector 24 is empirically predicted.

When the measurement by the measurement apparatus 1 is continued for a long period of time, since the optical systems such as the light source 23 and the photodetector 24 is contaminated, the stray light increases as indicated by a thick broken line IV in FIG. 2. Conversely, since the scattered light by the micro-particulate matter is shielded by the contamination of the optical system such as the light source 23 and the photodetector 24, the amount of arrival of the scattered light to the photodetector 24 decreases as indicated by a thick solid line I in FIG. 2. As can be seen from FIG. 2, the slope of the thick solid line III at the time of advancing contamination of the optical system is smaller than the slope of the thin solid line I at the time of cleanness of the optical system.

Figure 3:
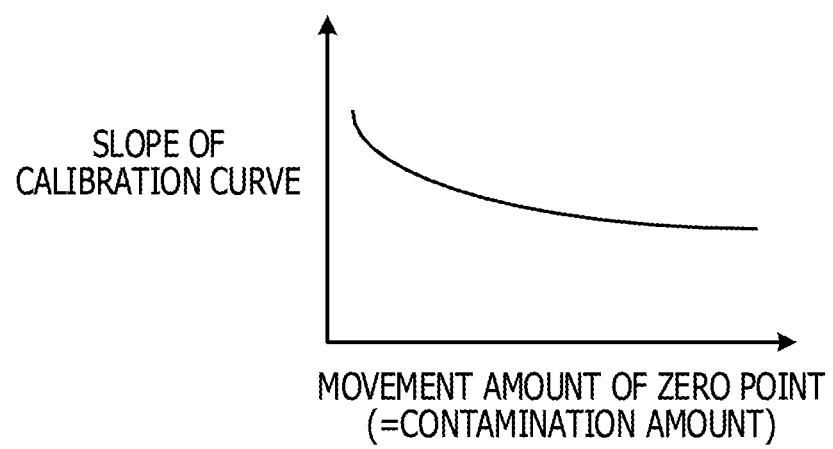
FIG. 3 is a view schematically illustrating an example of a relationship between a slope of a calibration curve and a movement amount of a zero point.

For example, the light intensity of the stray light is an index indicating the degree of contamination of the optical system such as the light source 23 and the photodetector 24, and the slope of a calibration curve indicating the relationship between the concentration of the micro-particulate matter and the digital output value of the ADC 142 may be regarded as a function of the light intensity of the stray light. FIG. 3 is a view schematically illustrating an example of the relationship between the slope of the calibration curve and the movement amount of a zero point corresponding to the contamination amount. In FIG. 3, the vertical axis represents the slope of the calibration curve in arbitrary units, and the horizontal axis represents the movement amount of zero point corresponding to the contamination amount in arbitrary units. As illustrated in FIG. 3, since the contamination of the optical system such as the light source 23 and the photodetector 24 is gradually accumulated with the use time of the measurement apparatus 1, the contamination amount continuously changes.

The relationship between the light intensity of the stray light and the slope of the calibration curve depends on the design of the actual optical system and the ingredients of adhered matter. Therefore, prior to the actual measurement by the measurement apparatus 1 in the embodiment, a micro-particulate matter concentration measurement apparatus and the measurement apparatus 1 in the embodiment simultaneously measure the concentration in parallel. An expression indicating the relationship between the light intensity of the stray light and the slope of the calibration curve may be empirically obtained from the micro-particulate matter concentration measured by each of the micro-particulate matter concentration measurement apparatus and the measurement apparatus 1 in the embodiment.

In the second state, in order to detect the micro-particulate group of the micro-particulate matter, the controller 16 may control the light source 23 so that the light source 23 turns on in a pulsed manner. In this case, the electric signal output of the photodetector 24 for detecting the light pulse from the light source 23 is input to the ADC 142 via the amplifier 141 of the second circuit 14. Therefore, by performing the detection synchronized with the pulse turn-on, the ADC 142 is able to measure the concentration of the micro-particulate matter with higher power consumption than a case where the light source 23 is always turned on.

Next, the operation of the measurement apparatus 1 in the first state will be described. When the concentration of the micro-particulate matter calculated based on the digital output value input from the second circuit 14 is less than the threshold value, the controller 16 switches the switches 12 and 15 to the side of the terminal "a" to enter the first state. In the first state, when the controller 16 drives and rotates the fan 22, the micro-particulate matter is introduced into the measurement tank 11 from the air inlet 11A via the virtual impactor 21. The light from the light source 23 is scattered by the micro-particulate matter and received by the photodetector 24. Since the concentration of the micro-particulate matter in the measurement tank 11 is proportional to the light intensity of the scattered light, the signal intensity of the electric signal output of the photodetector 24 reflects the concentration of the micro-particulate matter. Therefore, the concentration of the micro-particulate matter may be measured based on the count value obtained by counting the number of pulses having a height equal to or greater than the pulse height threshold value discriminated by the pulse height discriminator 132 out of the electric signal output of the photodetector 24 amplified by the amplifier 131.

Figure 4:
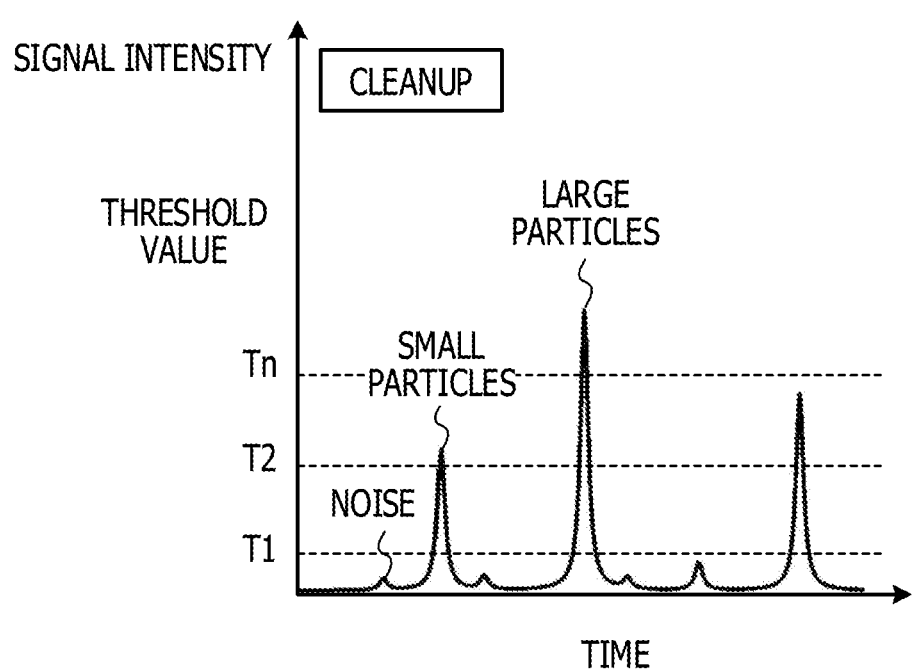
FIG. 4 is a view for explaining a counting detection method.
Figure 5:
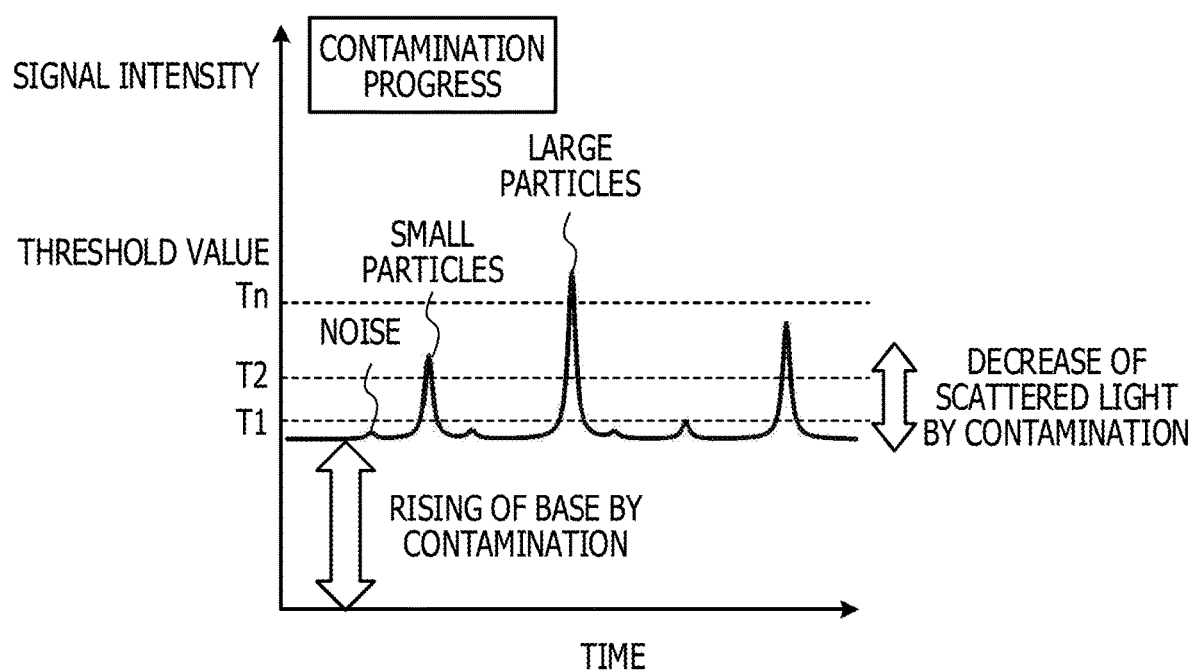
FIG. 5 is a view for explaining an example in which the degree of contamination of an optical system detected by an analog detection method is reflected in the counting detection method.

FIG. 4 is a view for explaining the counting detection method used by the first circuit 13. FIG. 5 is a view for explaining an example in which the degree of contamination of the optical system detected by the analog detection method used by the second circuit 14 is reflected in the counting detection method used by the first circuit 13. In FIGS. 4 and 5, the vertical axis represents the signal intensity of the electric signal output of the photodetector 24 in arbitrary units, and the horizontal axis represents time in arbitrary units. The signal intensity of the electric signal output of the photodetector 24 corresponds to the detected light intensity.

As illustrated in FIG. 4, when the micro-particulate matter traverses the field of view of the photodetector 24, a pulsed waveform corresponding to the scattered light appears in the electric signal output of the photodetector 24. The pulse height value corresponding to the scattered light, for example, the height (or amplitude) of the pulsed waveform varies depending on, for example, the particle diameter of the micro-particulate matter, the shape of particles, and the reflectance of particles. Therefore, in distinction from noise, a pulse height threshold value T1 is set in the pulse height discriminator 132 in order to exclude the micro-particulate matter having a diameter smaller than the particle diameter of a measurement target from the measurement target. By counting the number of pulses having a height equal to or greater than the pulse height threshold value T1 discriminated by the pulse height discriminator 132 out of the electric signal output of the photodetector 24 amplified by the amplifier 131, it is possible to measure the concentration of the micro-particulate matter equal to or smaller than the measurement target particle diameter.

Figure 6:
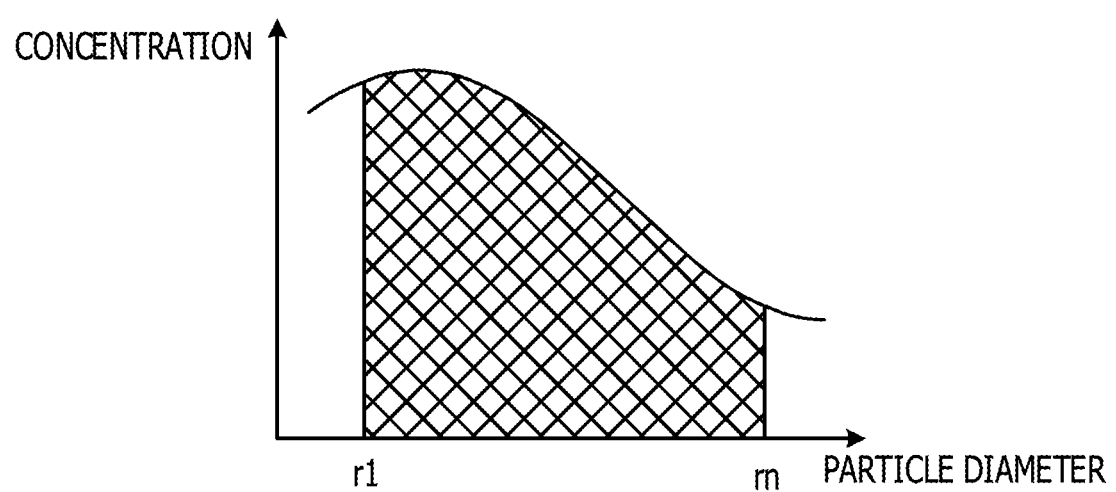
FIG. 6 is a view for explaining an example of the measurement result of the concentration of the micro-particulate matter.

FIG. 6 is a view for explaining an example of the measurement result of the concentration of the micro-particulate matter. In FIG. 6, the vertical axis represents the concentration of the micro-particulate matter in arbitrary units, and the horizontal axis represents the particle diameter of the micro-particulate matter in arbitrary units. In FIG. 6, the crossed hatching indicates the concentration of the micro-particulate matter whose measurement target particle diameter is within a range of r1 to m.

In order to obtain a particle diameter distribution of the micro-particulate matter, for example, plural pairs of the pulse height discriminator 132 and the counter 133 may be prepared, and the number of pulses discriminated by the pulse height discriminator 132 may be counted for each of plural threshold values T2, . . . , Tn (where, n is a natural number of 3 or more). In this case, the controller 16 switches the switches 12 and 15 to the first state and determines the plural threshold values T2, . . . , Tn for the plural pulse height discriminators 132 of the first circuit 13, and the plural counters 133 count the number of pulses discriminated by the plural pulse height discriminators 132 for each threshold value T2, . . . , Tn. In a case where the plural pairs of pulse height discriminators 132 and counters 133 are formed by a single DSP, the controller 16 may determine the plural threshold values T2, . . . , Tn and may control the DSP to cause the counters 133 to count the number of pulses discriminated by the pulse height discriminators 132 for each threshold value T2, . . . , Tn. In this way, the process of the controller 16 itself controlling the pulse height discriminators 132 and the counters 133 may be executed by the DSP. The controller 16 calculates the particle diameter distribution of the micro-particulate matter based on the count value for each threshold value T2, . . . , Tn.

Figure 7:
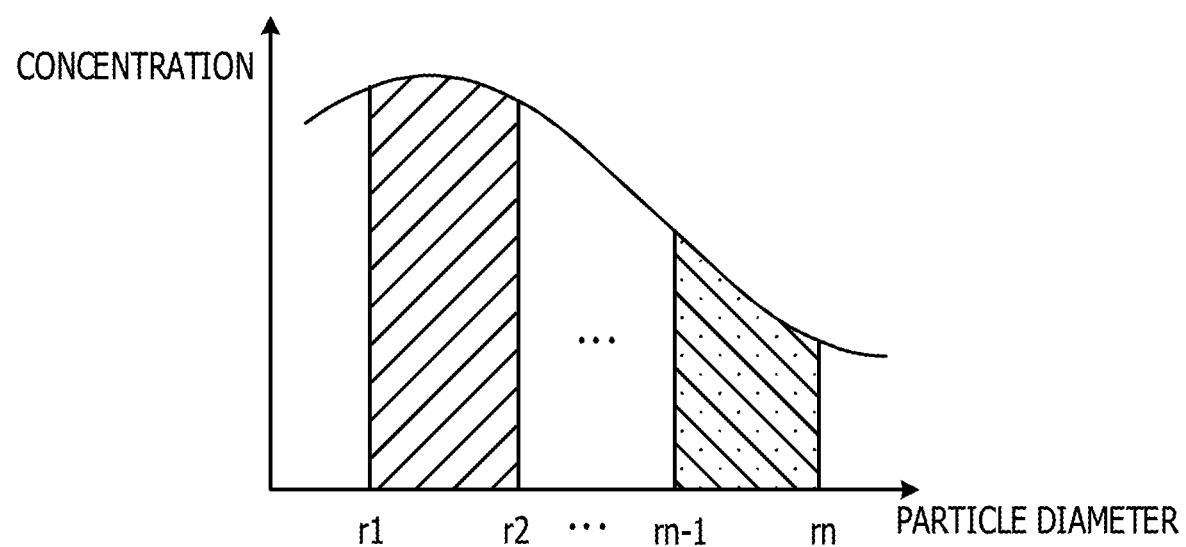
FIG. 7 is a view for explaining an example of the measurement result of a particle diameter distribution of the micro-particulate matter.

FIG. 7 is a view for explaining an example of the measurement result of the particle diameter distribution of the micro-particulate matter. In FIG. 7, the vertical axis represents the concentration of the micro-particulate matter in arbitrary units, and the horizontal axis represents the particle diameter of the micro-particulate matter in arbitrary units. In FIG. 7, a hatching indicates the particle diameter distributions r1 to r2, . . . , m−1 to m of the micro-particulate matter having the measurement target particle diameter.

Meanwhile, the contamination of the optical system such as the light source 23 and the photodetector 24 progresses even during the operation of the measurement apparatus 1 in the first state. Therefore, as illustrated in FIG. 5, the offset due to the stray light included in the incident light to the photodetector 24 increases and the pulse height value (for example, the height of the pulsed waveform) decreases. Accordingly, it is desirable to correct the threshold values T1, T2, . . . , Tn set in the pulse height discriminator 132 to threshold values T'1, T'2, . . . , T'n according to the degree of contamination of the optical system. For example, the threshold values set in the pulse height discriminator 132 may be corrected by executing the following steps ST11 to ST15.

In step ST11, in a state, obtained by that the controller 16 drives the fan 22, in which the micro-particulate matter is introduced into the measurement tank 11 from the air inlet 11A via the virtual impactor 21, switches the switches 12 and 15 to the side of the terminal "a" to enter the first state, and determines the threshold values T1, T2, . . . , Tn so as to correctly detect the micro-particulate matter having a particle diameter smaller than the measurement target particle diameter.

In step ST12, the controller 16 switches the switches 12 and 15 to the side of the terminal "b" to enter the second state, and stops the fan 22. The controller 16 reads the digital output value of the ADC 142 after a certain period of time until the micro-particulate matter in the measurement tank 11 sinks or adsorbs on the inner wall, and measures the intensity of the stray light.

In step ST13, based on the relationship between the intensity of the stray light and the slope of the calibration curve as illustrated in FIG. 3, which has been measured using the second circuit 14 prior to the actual measurement, the controller 16 calculates the threshold value T'1, T'2, . . . , T'n and sets the threshold value in the pulse height discriminator 132 of the first circuit 13.

In step ST14, the controller 16 drives the fan 22 so as to introduce the micro-particulate matter into the measurement tank 11 from the air inlet 11A via the virtual impactor 21, switches the switches 12 and 15 to the side of the terminal "a" to enter the first state, and reads the count value of the counter 133 of the first circuit 13.

In step ST15, the controller 16 repeats steps ST12 to ST14.

However, during the loop operation of steps ST12 to ST14, the controller 16 does not need to execute step ST12 every time, and may appropriately omit step ST12 until the time at which a progression of the contamination of the optical system is empirically predicted.

Therefore, the degree of contamination of the optical system may be estimated from the drift amount of the electric signal output of the photodetector 24 in the second state, and the accuracy of the concentration measurement in the second state may be maintained by using the calibration curve corresponding to the contamination amount. Further, by reflecting the contamination amount in the setting of the pulse height threshold value at the time of the first state, it is possible to perform the concentration measurement in which the influence of contamination is suppressed even in the first state.

Figure 8:
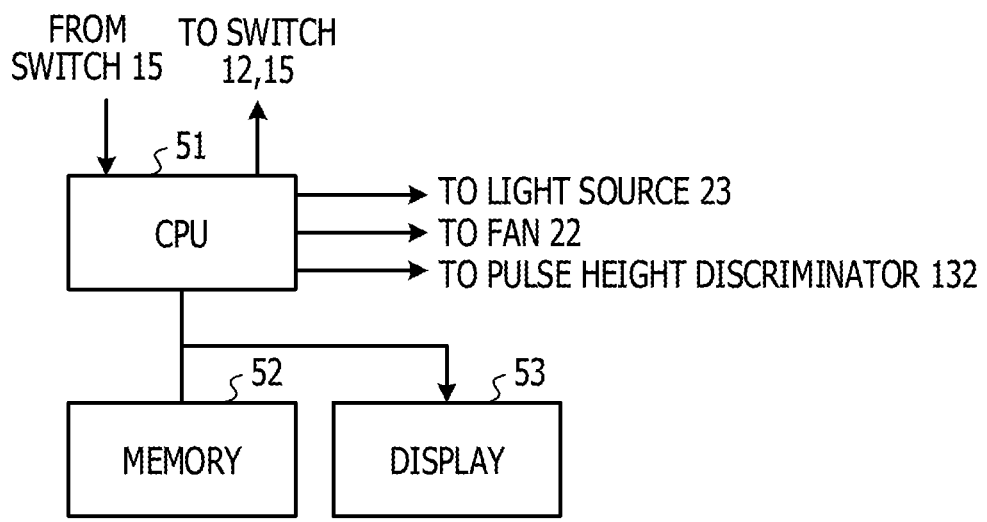
FIG. 8 is a block diagram illustrating an example of a computer.

FIG. 8 is a block diagram illustrating an example of a computer. A computer 50 illustrated in FIG. 8 includes a CPU (Central Processing Unit) 51 which is an example of a processor, a memory 52 which is an example of a storage device, and a display 53 which is an example of an output device. The memory 52 may form an example of a computer-readable storage medium that stores a program to be executed by the CPU 51. The computer-readable storage medium or the storage device may be, for example, a portable recording medium such as a CD-ROM (Compact Disk-Read Only Memory), a DVD (Digital Versatile Disk), or a USB (Universal Serial Bus) memory, a semiconductor memory such as a flash memory, or a disk drive using, for example, a magnetic disk, an optical disk, or a magneto-optical disk. The memory 52 is capable of storing various data such as parameters used in the calculation executed by the CPU 51 and intermediate and final results of the calculation. The CPU 51 is capable of executing the program stored in the memory 52 and can execute the process of the controller 16. The display 53 is capable of displaying, for example, the concentration of micro-particulate matter calculated by the CPU 51, the particle diameter distribution of the micro-particulate matter, and a message including a maintenance warning to a user.

Figure 9:
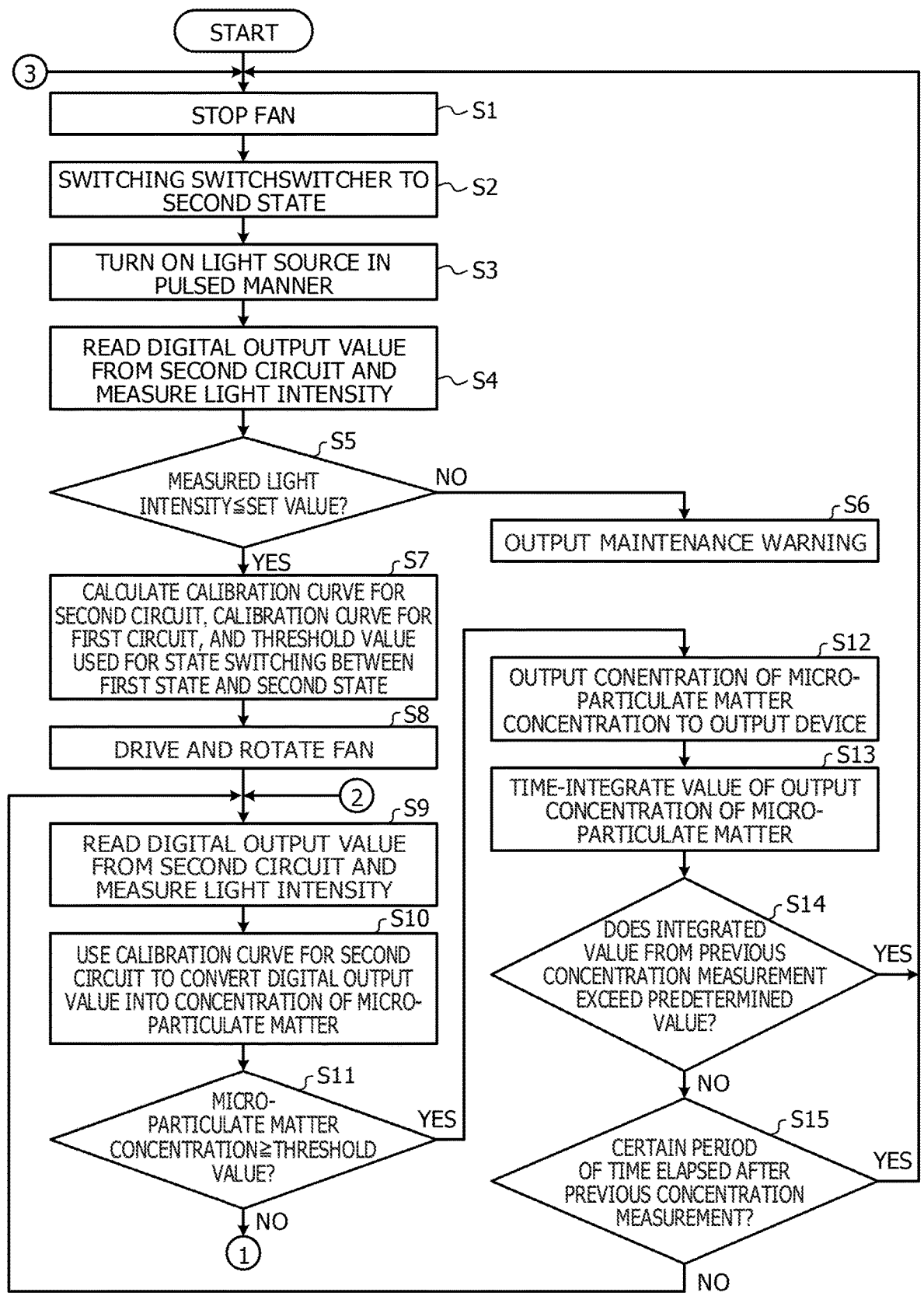
FIG. 9 is a flowchart for explaining an example of the operation of the measurement apparatus.
Figure 10:
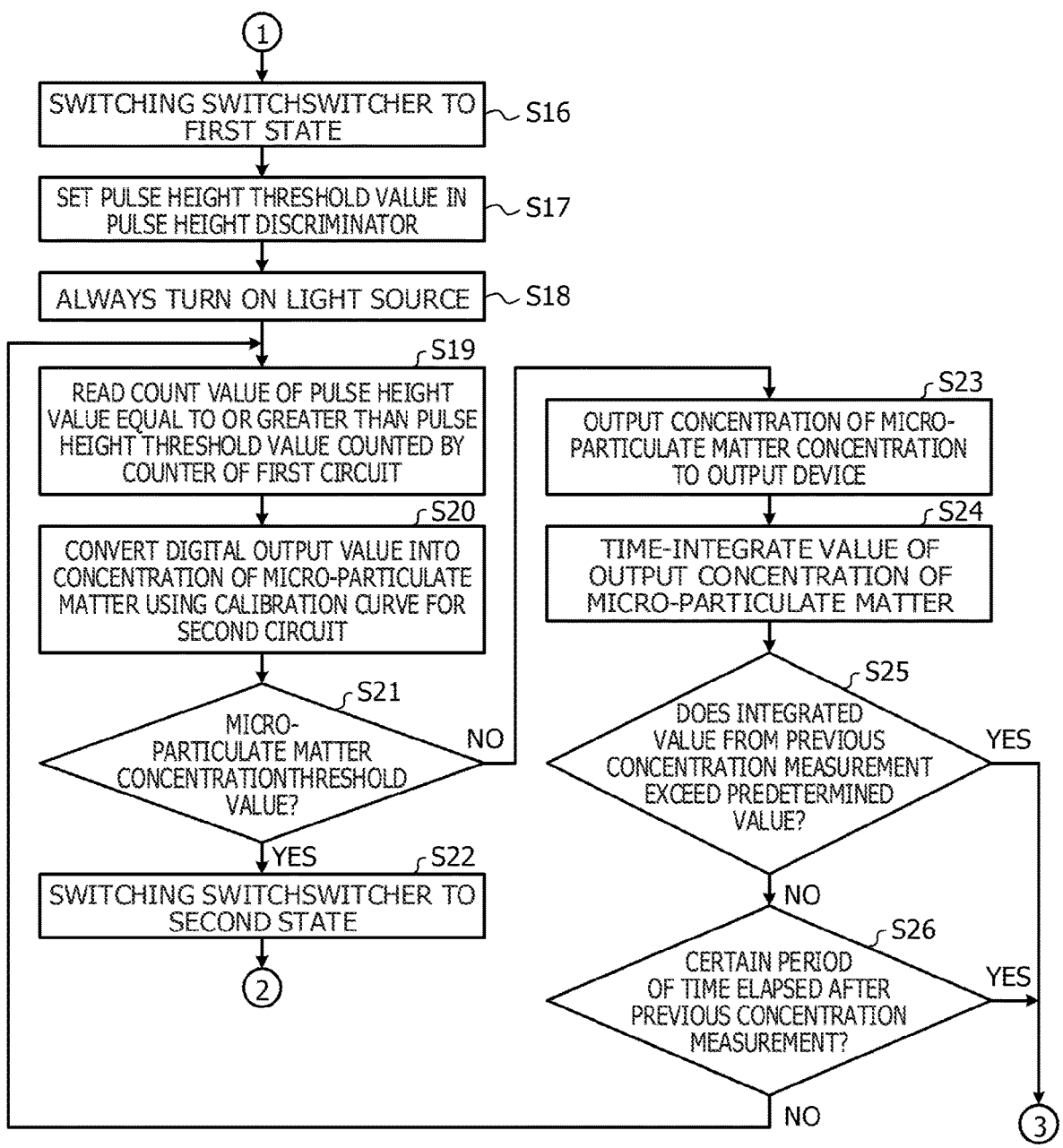
FIG. 10 is a flowchart for explaining another example of the operation of the measurement apparatus.

Next, an example of the operation of the measurement apparatus 1 will be described with reference to FIGS. 9 and 10. FIGS. 9 and 10 are flowcharts for explaining an example of the operation of the measurement apparatus. The process illustrated in FIGS. 9 and 10 may be executed by, for example, the controller 16 of the measurement apparatus 1 or the CPU 51 illustrated in FIG. 8. For the convenience of description, an example in which the CPU 51 executes the process of FIGS. 9 and 10 will be described below.

In step S1 illustrated in FIG. 9, the CPU 51 stops the fan 22. In step S2, the CPU 51 switches the switches 12 and 15 to enter the second state. In step S3, the CPU 51 turns on the light source 23 in a pulsed manner. In step S4, the CPU 51 reads the digital output value from the second circuit 14 and measures the light intensity. In step S5, the CPU 51 determines whether or not the measured light intensity is equal to or less than a set value. When the determination result is NO, the process proceeds to step S6. When the determination result is YES, the process proceeds to step S7. In step S6, the CPU 51 outputs a maintenance warning to notify the user that maintenance of the measurement apparatus 1 is necessary, such as cleaning of the optical system. The method of outputting the maintenance warning is not particularly limited, and may be displayed on, for example, the display 53 of the computer 50 illustrated in FIG. 8 included in the measurement apparatus 1.

Meanwhile, in step S7, the CPU 51 calculates the calibration curve for the second circuit 14, the calibration curve for the first circuit 13, and the threshold value used for state switching between the first state and the second state. In step S8, the CPU 51 drives and rotates the fan 22. In step S9, the CPU 51 reads the digital output value from the second circuit 14 and measures the light intensity. In step S10, the CPU 51 uses the calibration curve for the second circuit 14 to convert the digital output value into the concentration of the micro-particulate matter. In step S11, the CPU 51 determines whether or not the concentration of the micro-particulate matter is equal to or greater than a threshold value. When the determination result is YES, the process proceeds to step S12. Meanwhile, when the determination result in the step S11 is NO, the process proceeds to step S16 illustrated in FIG. 10 which will be described later.

In step S12, the CPU 51 outputs the concentration of the micro-particulate matter to the output device 17. In step S13, the CPU 51 time-integrates the value of the concentration of the micro-particulate matter output by the CPU 51. In step S14, the CPU 51 determines whether or not the integrated value from the previous concentration measurement exceeds a predetermined value. When the determination result is NO, the process proceeds to step S15. When the determination result is YES, the process returns to step S1. In step S15, the CPU 51 determines whether or not a certain period of time has elapsed after the previous concentration measurement. When the determination result is NO, the process returns to step S9. When the determination result is YES, the process returns to step S1.

In step S16 illustrated in FIG. 10, the CPU 51 switches the switches 12 and 15 to enter the first state. In step S17, the CPU 51 sets a pulse height threshold value in the pulse height discriminator 132 of the first circuit 13. In step S18, the CPU 51 always turns on the light source 23. In step S19, the CPU 51 reads the count value of the number of pulses discriminated by the pulse height discriminator 132 of the first circuit 13, which is counted by the counter 133 of the first circuit 13. In step S20, the CPU 51 converts the count value read using the calibration curve for the first circuit 13 into the concentration of the micro-particulate matter. In step S21, the CPU 51 determines whether or not the concentration of the micro-particulate matter is equal to or greater than the threshold value. When the determination result is YES, the process proceeds to step S22. Meanwhile, when the determination result in step S21 is NO, the process proceeds to step S23 to be described later. In step S22, the CPU 51 switches the switches 12 and 15 to enter the second state, and the process returns to step S9 illustrated in FIG. 9.

In step S23, the CPU 51 outputs the concentration of the micro-particulate matter to the output device 17. In step S24, the CPU 51 time-integrates the value of the concentration of the micro-particulate matter output by the CPU 51. In step S25, the CPU 51 determines whether or not the integrated value from the previous concentration measurement exceeds a predetermined value. When the determination result is NO, the process proceeds to step S26. When the determination result is YES, the process returns to step S1 illustrated in FIG. 9. In step S26, the CPU 51 determines whether or not a certain period of time has elapsed after the previous concentration measurement. When the determination result is NO, the process returns to step S19. When the determination result is YES, the process returns to step S1 illustrated in FIG. 9.

However, the contamination of the optical system is not limited to direct contamination of, for example, the light source 23 and the photodetector 24. For example, when the light source 23 is disposed outside the measurement tank 11 and light is irradiated through a window provided in the measurement tank 11, a transparent member provided in the window is contaminated. Similarly, when the photodetector 24 is disposed outside the measurement tank 11 and the scattered light is received through a window provided in the measurement tank 11, a transparent member provided in the window is contaminated.

According to the above embodiment, it is possible to measure the micro-particulate matter with high accuracy in a wide concentration range from a low concentration to a high concentration. In addition, since the light scattering method is used, it is possible to provide an inexpensive and compact measurement apparatus as compared with the beta ray absorption type or TEOM type measurement apparatus used in the atmospheric measurement stations. Further, it is possible to measure the micro-particulate matter with high accuracy by correcting the deviation of the measurement value generated by using the measurement apparatus over a long period of time. Therefore, it is possible to measure the concentration of the micro-particulate matter with high accuracy by suppressing the influence of contamination of the optical system without increasing the number of steps associated with cleaning.

Figure 11:
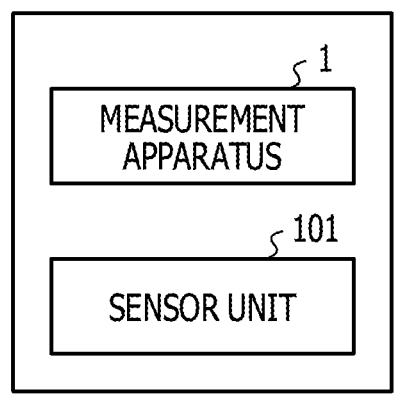
FIG. 11 is a block diagram illustrating an example of an environment measurement apparatus according to an embodiment.

FIG. 11 is a block diagram illustrating an example of an environment measurement apparatus according to an embodiment. The environment measurement apparatus 200 illustrated in FIG. 11 includes a measurement apparatus 1 of the above embodiment, and a sensor unit 201. The sensor unit 201 includes a well-known sensor for measuring at least one of temperature, humidity, air pressure, gas, and radiation. According to such an environment measurement apparatus 200, it is possible to measure the micro-particulate matter in a measurement environment in a wide concentration range from a low concentration to a high concentration with high accuracy, measure at least one of temperature, humidity, air pressure, gas, and radiation in the measurement environment, and measure plural types of environmental information in parallel. Further, since the measurement apparatus 1 is capable of measuring the concentration of the micro-particulate matter with high accuracy while suppressing the influence of contamination of the optical system without increasing the number of processes associated with the cleaning, it is possible to measure the plural types of environmental information with high accuracy over a long period of time by using an appropriate sensor unit 201.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A measurement apparatus comprising:
   a measurement tank including an air inlet and an air outlet;
   a fan installed at the air outlet;
   a light source configured to irradiate micro-particulate matter disposed in the measurement tank with light;
   a photodetector configured to detect scattered light from the micro-particulate matter in the measurement tank;
   a first circuit configured to detect individual particles of the micro-particulate matter which flows from the air inlet to the air outlet in the measurement tank based on an output of the photodetector;
   a second circuit configured to detect a micro-particle group of the micro-particulate matter which flows from the air inlet to the air outlet in the measurement tank based on the output of the photodetector;
   a switch configured to switch into one of a first state in which the output of the photodetector is input to the first circuit and a second state in which the output of the photodetector is input to the second circuit; and
   a controller configured to control a drive and stop of the fan, a turn-on and a turn-off of the light source, and a switching of a state of the switch,
   wherein the controller turns on the light source while the fan is being driven, controls the switch in such a manner that the state is switched to the second state when a concentration of the micro-particulate matter which is calculated from the output of the first circuit is equal to or greater than a threshold value, and switches the switch to enter the first state when the concentration of the micro-particulate matter which is calculated from the output of the second circuit is less than the threshold value.

2. The measurement apparatus according to claim 1, wherein the first circuit includes a pulse height discriminator to which the output of the photodetector is input via the switch, and a counter to which an output of the pulse height discriminator is input,
   the second circuit includes an analog-digital converter to which the output of the photodetector is input via the switch,
   the controller sets a pulse height threshold value, and
   the counter counts the number of pulses equal to or greater than the pulse height threshold value discriminated by the pulse height discriminator.

3. The measurement apparatus according to claim 2, wherein the controller switches the switch to enter the second state, determines a conversion function which converts an output of the analog-to-digital converter into the concentration of the micro-particulate matter based on the output of the analog-digital converter after a certain period of time has elapsed after the fan is stopped while the light source is turned on, drives the fan while the light source is turned on, and calculates the concentration of the micro-particulate matter based on the output of the analog-digital converter and the conversion function.

4. The measurement apparatus according to claim 2, wherein the controller controls the switch in such a manner that the state is switched to the second state and determines the pulse height threshold value of the pulse height discriminator based on the output of the analog-digital converter after a certain period of time has elapsed after the fan is stopped while the light source is turned on, and
   the controller switches the switch to enter the first state, drives the fan while the light source is turned on, sets the pulse height threshold value in the pulse height discriminator, and calculates the concentration of the micro-particulate matter based on the count value of the counter.

5. The measurement apparatus according to claim 2, wherein the controller switches the switch to enter the second state and corrects the pulse height threshold value based on the output of the analog-digital converter after a certain period of time has elapsed after the fan is stopped while the light source is turned on.

6. The measurement apparatus according to claim 2, wherein the controller switches the switch to enter the first state and determines a plurality of pulse height threshold values of the pulse height discriminator,
   the counter counts the number of pulses which are discriminated by the pulse height discriminator for each pulse height threshold value, and
   the controller calculates a particle diameter distribution of the micro-particulate matter based on the count value for each pulse height threshold value.

7. The measurement apparatus according to claim 1, wherein the controller turns on the light source in a pulsed manner in the second state.

8. The measurement apparatus according to claim 1, further comprising: a secondary switch configured to input the output of the first circuit to the controller in the first state and input the output of the second circuit to the controller in the second state,
   wherein the controller switches a state of the secondary switch to the first state or the second state in synchronization with the state of the switch.

9. The measurement apparatus according to claim 1, further comprising: a virtual impactor installed at the air inlet and configured to introduce the micro-particulate matter having a particle diameter smaller than the particle diameter of a measurement target into the measurement tank via the air inlet.

10. An environment measurement apparatus comprising:
    a measurement apparatus; and
    a sensor configured to measure at least one of temperature, humidity, air pressure, gas, and radiation,
    wherein the measurement apparatus includes:
    a measurement tank including an air inlet and an air outlet;
    a fan installed at the air outlet;
    a light source configured to irradiate micro-particulate matter disposed in the measurement tank with light;
    a photodetector configured to detect scattered light from the micro-particulate matter in the measurement tank;
    a first circuit configured to detect individual particles of the micro-particulate matter which flows from the air inlet to the air outlet in the measurement tank based on an output of the photodetector;
    a second circuit configured to detect a micro-particle group of the micro-particulate matter which flows from the air inlet to the air outlet in the measurement tank based on the output of the photodetector;
    a switch configured to switch into one of a first state in which the output of the photodetector is input to the first circuit and a second state in which the output of the photodetector is input to the second circuit; and
    a controller configured to control a drive and stop of the fan, a turn-on and a turn-off of the light source, and a switching of a state of the switch,
    wherein the controller turns on the light source while the fan is being driven, controls the switch in such a manner that the state is switched to the second state when a concentration of the micro-particulate matter which is calculated from the output of the first circuit is equal to or greater than a threshold value, and controls the switch in such a manner that the state is switched to the first state when the concentration of the micro-particulate matter which is calculated from the output of the second circuit is less than the threshold value, wherein the measurement apparatus and the sensor unit operate in parallel.

11. A measurement method comprising:
detecting, by a photodetector, scattered light from micro-particulate matter flowing from an air inlet to an air outlet at which a fan is installed, by irradiating the micro-particulate matter with light from a light source in a measurement tank;
detecting, by a first circuit, individual particles of the micro-particulate matter in a first state based on an output of the photodetector;
detecting, by a second circuit, a micro-particle group of the micro-particulate matter in a second state based on the output of the photodetector; and
controlling, by a controller, the light source to be turned on while the fan is being driven, a switch to enter the second state when the concentration of the micro-particulate matter which is calculated from an output of the first circuit is equal to or greater than a threshold value, and the switch to enter the first state when the concentration of the micro-particulate matter which is calculated from an output of the second circuit is less than the threshold value.

12. The measurement method according to claim 11, wherein the first circuit includes a pulse height discriminator to which the output of the photodetector is input via the switch, and a counter to which an output of the pulse height discriminator is input,
the controller sets a pulse height threshold value, and
the counter counts the number of pulses equal to or greater than the pulse height threshold value discriminated by the pulse height discriminator.

13. The measurement method according to claim 12, wherein the controller switches the switch to enter the second state and determines a conversion function which converts an output of an analog-to-digital converter of the second circuit into the concentration of the micro-particulate matter based on the output of the analog-digital converter after a certain period of time has elapsed after the fan is stopped while the light source is turned on, and
the controller drives the fan in the second state while the light source is turned on, and calculates the concentration of the micro-particulate matter based on the output of the analog-digital converter and the conversion function.

14. The measurement method according to claim 12, wherein the controller determines the pulse height threshold value of the pulse height discriminator in the second state based on the output of the analog-digital converter of the second circuit after a certain period of time has elapsed after the fan is stopped while the light source is turned on, and
the controller drives the fan in the first state while the light source is turned on, sets the pulse height threshold value in the pulse height discriminator, and calculates the concentration of the micro-particulate matter based on the count value of the counter.

15. The measurement method according to claim 12, wherein the controller corrects the pulse height threshold value in the second state based on the output of the analog-digital converter of the second circuit after a certain period of time has elapsed after the fan is stopped while the light source is turned on.

16. The measurement method according to claim 12, wherein the controller determines a plurality of pulse height threshold values of the pulse height discriminator in the first state,
the counter counts the number of pulses which are discriminated by the pulse height discriminator for each pulse height threshold value, and
the controller calculates a particle diameter distribution of the micro-particulate matter based on the count value for each pulse height threshold value.

17. The measurement method according to claim 11, wherein the controller turns on the light source in a pulsed manner in the second state.

* * * * *